United States Patent [19]
Johnson et al.

[11] Patent Number: 5,606,602
[45] Date of Patent: Feb. 25, 1997

[54] BIDDING FOR TELECOMMUNICATIONS TRAFFIC

[75] Inventors: Jack J. Johnson; William F. Coyle, both of Summit, N.J.

[73] Assignee: Summit Telecom Systems, Inc., Summit, N.J.

[21] Appl. No.: 553,889

[22] Filed: Nov. 6, 1995

[51] Int. Cl.$^6$ ............... H04M 15/00; H04M 7/00
[52] U.S. Cl. ............... 379/115; 379/112; 379/113; 379/114; 379/121; 379/133; 379/134; 379/220; 379/221
[58] Field of Search ............... 379/111–115, 121, 379/133, 134, 220, 221

[56] References Cited

U.S. PATENT DOCUMENTS

| | | | |
|---|---|---|---|
| 4,122,308 | 10/1978 | Weinberger | 179/7.1 R |
| 4,410,765 | 10/1983 | Hestad | 179/7.1 R |
| 4,486,626 | 12/1984 | Kohler | 179/18 |
| 4,567,359 | 1/1986 | Lockwood | 235/381 |
| 4,580,011 | 4/1986 | Glaser | 179/10 |
| 4,585,904 | 4/1986 | Mincone | 379/112 |
| 4,640,986 | 2/1987 | Yotsutani | 379/60 |
| 4,706,275 | 11/1987 | Kamil | 379/144 |
| 4,751,728 | 7/1988 | Treat | 379/113 |
| 4,782,485 | 11/1988 | Gollub | 370/118 |
| 4,972,464 | 11/1990 | Webb | 379/112 |
| 5,173,933 | 12/1992 | Jabs | 379/58 |
| 5,216,591 | 6/1993 | Nemirovsky | 364/401 |
| 5,289,536 | 2/1994 | Hokari | 379/221 |
| 5,400,395 | 3/1995 | Berenato | 379/114 |
| 5,425,085 | 6/1995 | Weinberger et al. | 379/112 |
| 5,425,089 | 6/1995 | Brinskele | 379/111 |
| 5,515,425 | 5/1996 | Penzias | 379/121 |
| 5,519,769 | 5/1996 | Weinberger | 379/115 |

*Primary Examiner*—Curtis Kuntz
*Assistant Examiner*—Vijay Shankar
*Attorney, Agent, or Firm*—Allen N. Friedman

[57] ABSTRACT

Telecommunication switches (e.g., PBX's or local exchange carrier's switches) route calls in accordance with economic incentives (e.g., least cost routing) resulting from a bidding process between participating interexchange telecommunication carriers (Carriers) by operation of a central processor, a computer referred to as a bidding moderator (Moderator). Each of the Carriers informs the Moderator of the rate it is willing to charge (or other economic incentive it is willing to offer) for service between two specific points in the telecommunication network at some particular time. The Moderator collects this bid information from all the Carriers, sorts it among originating points and transmits it to an adjunct processor at each subscribing switch location and to all participating Carriers' network management centers. From the list of all Carriers providing bid information to the Moderator, each Subscriber can select those Carriers to which it wants traffic routed and can change that selection at any time. After each new bid is submitted by a Carrier and is processed by the Moderator, it is distributed to both the relevant Subscribers and all other Carriers. All Carriers have the opportunity to submit at any time a lower or higher bid for any point-to-point routes on which they wish, respectively, to stimulate or discourage additional traffic. The Moderator could offer a different class of service to end users who are calling parties by broadcasting each carrier's bid to an interface unit at each user location.

47 Claims, 7 Drawing Sheets

BIDDING FOR TELECOMMUNICATIONS TRAFFIC

BACKGROUND OF THE INVENTION

1. Field of the Invention

The invention is in the field of telecommunication network control.

2. Description of the Background Art

Many locally managed telecommunication systems, such as PBXs, employ "least cost routing" software to reduce telecommunication costs. The system's manager arranges with more than one interexchange carrier to carry the system's traffic from the local exchange to which it is connected to other exchanges. The manager keeps track of each carrier's charges and populates the routing table in the "least cost routing" software. The charges may be the regularly tariffed charges of the subscriber's primary carrier or contracted charges offered by an alternate carrier for a bulk discount or for discounting traffic during a specific time period during the day. The "least cost routing" software will examine each call attempt and automatically decide which carrier is the best economic choice for that call. If the call attempt fails, the software usually defaults the call attempt to the subscriber's primary carrier.

Recently a great deal of competition has developed between telecommunication carriers. This has been stimulated by both regulatory and technological changes. As telecommunication becomes more of a commodity it would be of great benefit to consumers to stimulate this competition and facilitate the consumer's ability to make economic choices between telecommunication carriers.

SUMMARY OF THE INVENTION

Provision of telecommunication services is presently dominated by fixed contractual relationships between users and service providers. However, because of technological and regulatory changes, telecommunication service is becoming more of a commodity, with competition between service providers for the users' traffic. The herein disclosed invention stimulates this competition and facilitates the consumer's ability to make economic choices between telecommunication carriers. In this method and system, telecommunication switches (e.g., PBX's or local exchange carriers' Centrex-enabled switches) route calls in accordance with economic incentives (e.g., least cost routing) resulting from a bidding process between participating interexchange telecommunication carriers (Carriers), administered by a bidding service provider through operation of a central processor, a computer referred to as a bidding moderator (Moderator).

In this arrangement, each of the Carriers transmits to the Moderator the rate it is willing to charge (or other economic incentive it is willing to offer) for service between two specific points, from an originating point NPA-NXX to a terminating point NPA-NXX, at some particular time. This "bid" rate may be lower than that Carrier's established rate for any of several reasons (e.g., the Carrier has excess capacity on that route at that time). The carrier may, for example, also decide for capacity or competitive reasons to place the same bid on all traffic originating at a specified NPA-NXX independent of destination or on all traffic independent of originating point and destination. The Carrier may change its bids as often as it likes during the day as traffic patterns change. The Moderator collects this bid information from all the Carriers, sorts it among originating points, and transmits it to an adjunct processor at each appropriate subscribing switch location and to all participating Carriers' network management centers. Each subscribing switch (Subscriber) gets the rate information submitted by all Carriers to the Moderator for all "point-to-point routes" originating in the Subscriber's NPA-NXX. The Moderator provides each Carrier with all bid information from all Carriers for all point-to-point routes possible (from any NPA-NXX to any other NPA-NXX, or otherwise-defined telecommunications network destination, in the world).

From the list of all Carriers providing bid information to the Moderator, each Subscriber can select those Carriers to which it wants traffic routed and can change that selection at any time. The Subscriber downloads the bid information of those selected Carriers into the routing tables of the "least cost routing" software in its switch. After each new bid is submitted by a Carrier and is processed by the Moderator, it will be distributed to both the relevant Subscribers and all other Carriers. All Carriers will have the opportunity thereafter to submit a lower or higher bid for any point-to-point routes on which they wish, respectively, to stimulate or discourage additional traffic.

Similarly, the Moderator could offer a different class of service directly to end users who are calling parties. As part of such a service, Carriers will provide an economic incentive for all such end users in a given NPA-NXX (or group of NPA-NXXs) to originate calls terminating anywhere (e.g., by means of a low rate or stated discount). In that case the Moderator would broadcast (by wired data link or wireless transmission) each carrier's bid to an interface unit at each end user location. The information may be displayed for evaluation by the end user or processed within the interface unit, with direction from the end user, and all outgoing calls routed to the selected carrier. If the carrier information is displayed for the end user, the user can choose a carrier for a call attempt and key in the selected carrier's carrier identification code before the desired destination address (e.g., telephone number). If the information is processed automatically within an interface unit in the line between the user's terminal equipment and the local exchange, the interface unit can automatically insert the appropriate carrier identifier before outgoing telephone numbers.

Through this bidding process, carriers can compete for traffic on selected routes or compete for traffic originating from selected points in the telecommunication network. They can also manage their network traffic by adjusting their bids from time to time, depending on network traffic information or other network information. And users can easily make economic choices.

DETAILED DESCRIPTION OF THE INVENTION

Figure 1:
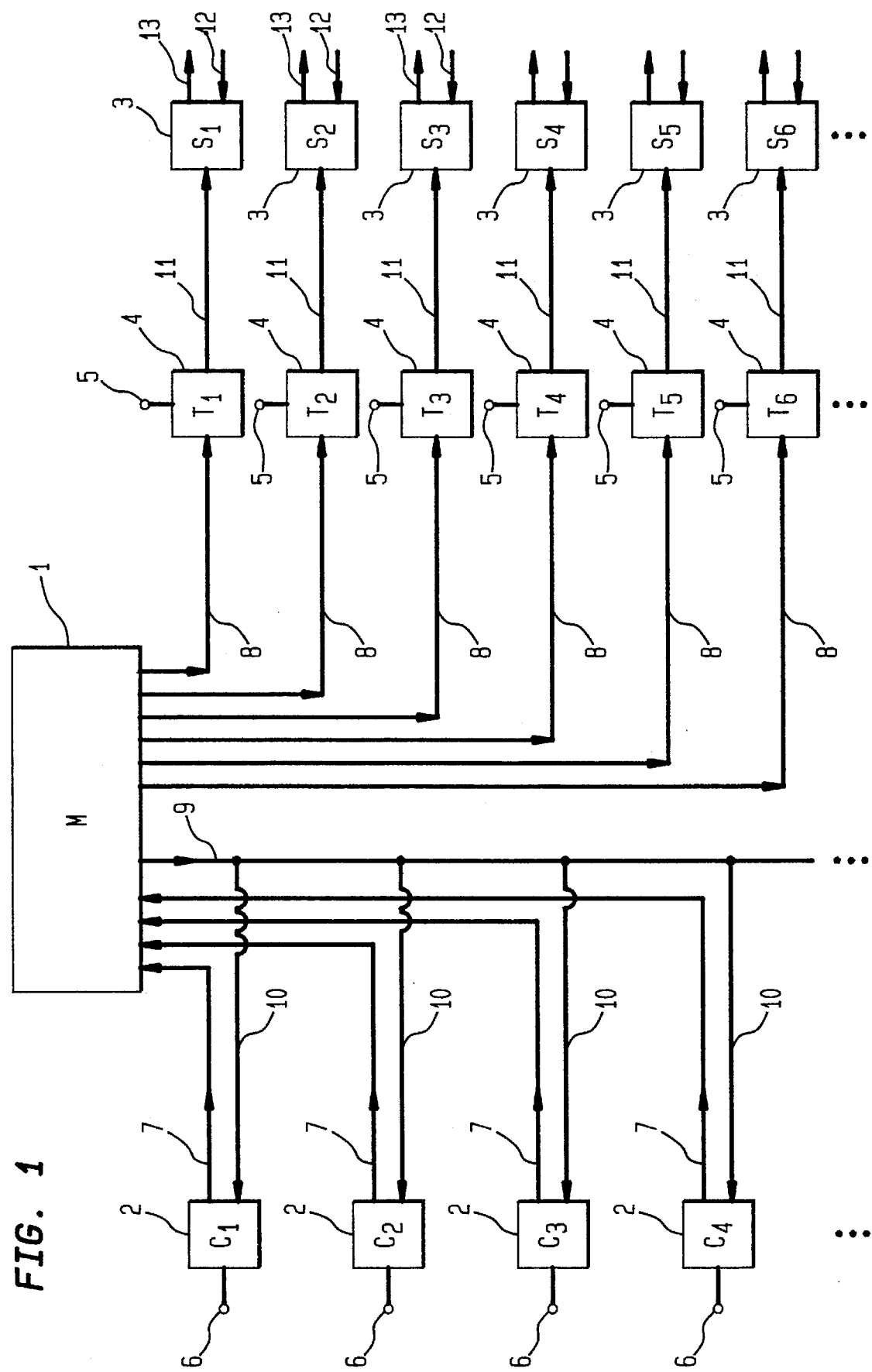
FIG. 1 is a schematic view of an exemplary system of the invention showing dedicated communication lines from each Carrier to the Moderator, from the Moderator to each of the subscribing switches, and a common data link from the Moderator to each of the Carriers.

FIG. 1 shows an exemplary system for carrying out the herein disclosed bidding process for telecommunication services, in which a Moderator i administers collection and dissemination of bidding information. The Moderator 1 includes a computer with a processor and memory, together with input and output devices to communicate with the Carriers' network management computers 2, which are the source of the bidding information, and the switches 3, which are the ultimate users of the information.

The Carriers are, primarily, interexchange carriers that carry telecommunication traffic between local exchange switches. By means of the FIG. 1 system, the Carriers bid for traffic from subscribing switches 3, associated with a local exchange switch, to other local exchange switches. The Carriers transmit their bids from their network management computers 2 over data links 7, which may be either analog (using modems) or digital. However, the information is usually transmitted in digital form for input into the Moderator 1. Each Carrier has a network administrator who enters network management instructions into each network management computer 2 through input port 6 by means, for example, of a keyboard or a data link from a remote site or local computer.

The Moderator 1 receives the bids, processes them in its processor, and enters them into a database in its memory by means of the data buses and registers internal to a computer. The processed bids, applicable to each subscribing switch 3, are transmitted to such switch 3, by way of a computer 4 adjunct to the switch 3 over a data link 8. The data link 8 is illustrated as a dedicated transmission facility between the Moderator 1 and each switch 3. However, any other transmission technology offering a selective way to transmit data from the Moderator 1 to the switch may be used. (A "transmission facility" is a telecommunication path or channel. It may be, for example, a wired link, a radio channel in a wireless system, or a time slot in a digitally multiplexed optical transmission system). The data inputs and outputs of the Moderator 1, the network management computers 2, the adjunct computers 4, and the switches 3 are implemented by such devices as interfaces, registers and modems that are well known in the art.

An adjunct computer is known in the art to be a computer, closely associated with a switch, that provides the switch's operating software additional data or operating logic to provide the switch with additional operational capability. In the herein disclosed architecture the adjunct computer 4 enters the bids received from the Moderator 1 into a database in its memory and receives, through input port 5, decision rules from the switch administrator. Software in the computer's processor accesses the data in memory and applies the decision rules to the bid data, producing the rate data required to populate the routing tables of the least cost routing software in the switch 3. The adjunct computer 4 communicates with the switch 3 over a digital data link or data bus 11. If the switch 3 has enough processing capacity, the function of the adjunct computer 4 may be incorporated in the switch's processor and memory. In this case the switch must also provide input ports to receive transmission line 8 and input 5 for the switch administrator. Each switch 3 receives call attempts over incoming lines 12. Each call attempt includes routing data identifying the call's destination. The switch's least cost routing software then selects the carrier to which the call attempt shall be routed over outgoing line 13.

An alternative to use of a PBX, a private switch, is subscription to Centrex service, in which the end users' switch is a software-defined portion of the local central office switch. With data links between the adjunct computer 4 and the local central office switch, the end users' switch administrator can administer the end user portion of the bidding process in much the same way as if a PBX were being administered. In addition, instead of using a PBX or subscribing to a Centrex service, a residential or small business customer could subscribe to a "least cost routing" feature offered by the local exchange carrier as part of its enhanced calling services (currently including call waiting, call forwarding, 3-way calling, speed dialing, etc.). As with Centrex service the end users' switch enabling these enhanced calling features is a software-defined portion of the local central office switch.

The Moderator 1 also transmits all received bids to the network management computers 2 of all Carriers over the data link 9, 10. The exemplary architecture of FIG. 1 shows a combination of a single output data link 9 and individual Carrier input link 10 for this Moderator-to-Carriers bid data, indicating that the Moderator 1 sends the same data to all Carriers. There are many alternate transmission technologies available to broadcast this bid data to all Carriers, including dedicated bidirectional links between the Moderator 1 and each Carrier, combining the function of lines 7, 9, and 10.

Figure 2:
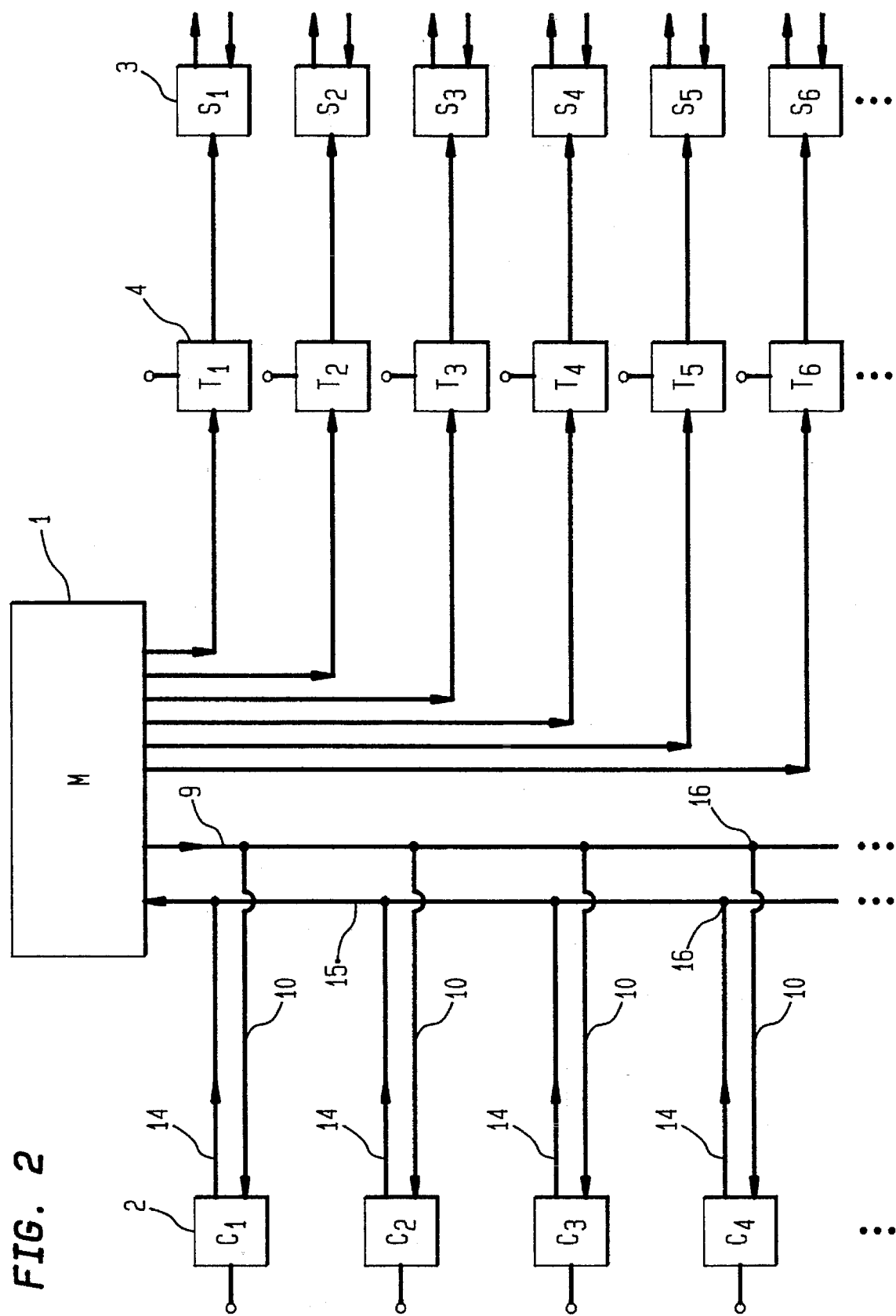
FIG. 2 is a schematic view of an exemplary system of the invention showing the Carriers using a shared data link to provide information to the Moderator.

FIG. 2 illustrates an alternative network architecture in which the individual Carrier-to-Moderator data links 14 share a common data input line 15 into the Moderator 1. This can be done, for example, by means of fiber optics using the SONET transmission protocol and ATM technology. This would require an ATM switching module at each junction 16 between the individual carrier links 10, 14 and the common Moderator input-output lines 9, 15.

Figure 3:
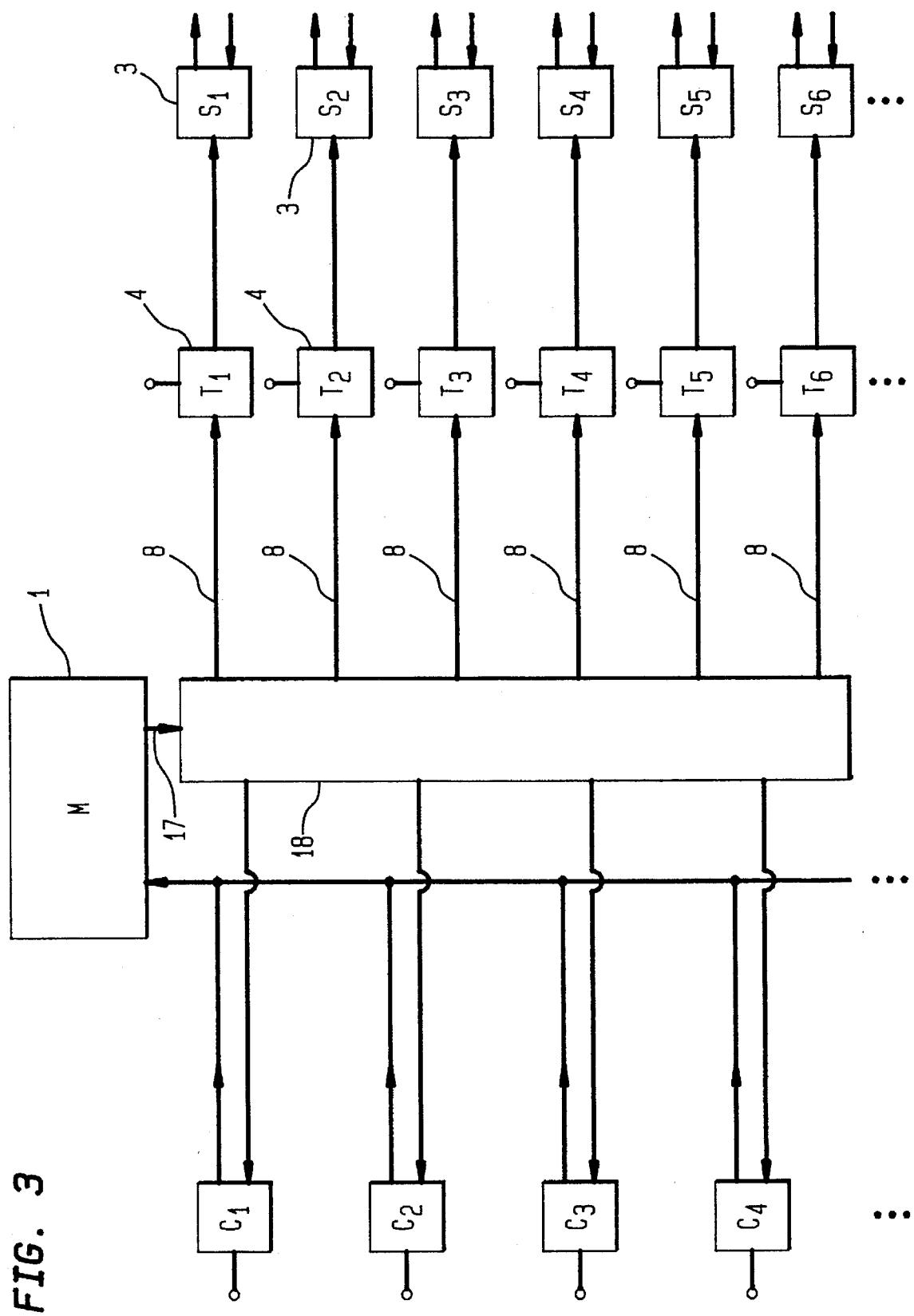
FIG. 3 is a schematic view of an exemplary system of the invention showing switched access from the Moderator to each of the subscribing switches and to each Carrier.

FIG. 3 illustrates an architecture incorporating switched access from the Moderator 1 to the switches 3. In this architecture a single Moderator output link 17 transmits each subscribing switch's bid data to a switch 18, which may be a dedicated switch or part of the public switched network. The bid information appropriate to each subscribing switch 3 is switched to each individual switch data link 8.

Figure 4:
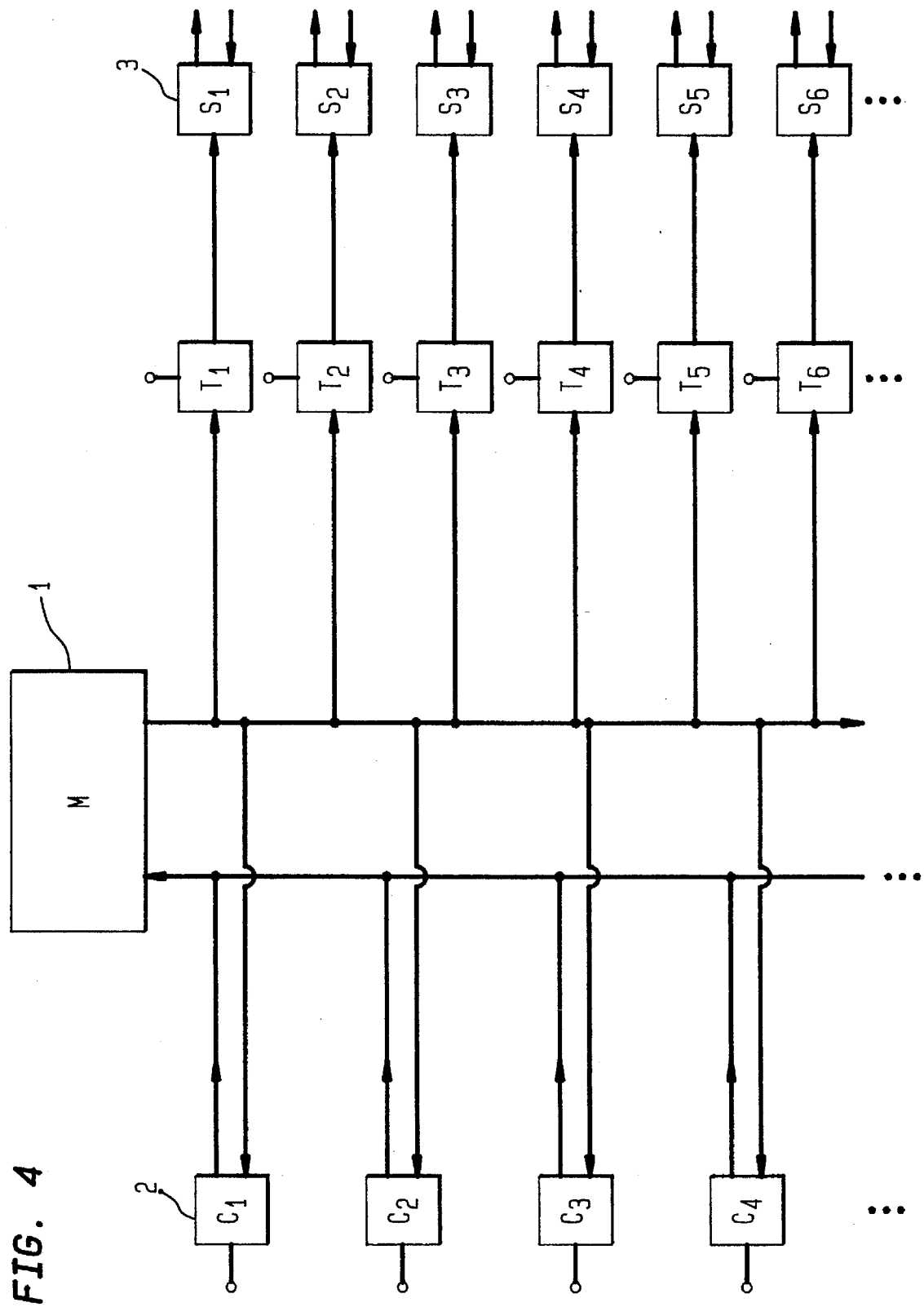
FIG. 4 is a schematic view of an exemplary system of the invention showing use of a shared data facility, such as a local area network, for communication from the Moderator to each of the subscribing switches and to each Carrier.

FIG. 4 illustrates use of shared facilities between the Moderator 1 and each of the switches 3 and the Carriers' network management computers 2. This could be accomplished, for example, by many known local area network (LAN), metropolitan area network (MAN), and wide area network (WAN) technologies.

The economic choices presented to telecommunication service users under this invention depend on bids submitted by carriers for telecommunication traffic over the routes they serve. Each route is defined by the local exchange switch serving its originating point and the local exchange switch serving its terminating point. Each local exchange switch is identified in the North American Numbering Plan by a unique NPA-NXX code, where the NPA is a three digit numbering plan area identifier (e.g., area code 201 identifies Northern New Jersey) and NXX is a three digit code identifying a particular local exchange switch within the numbering plan area. The interexchange carriers that utilize this bidding process are identified by a carrier access code. This code may be, for example, a "1" signifying the end user's primary carrier, a 5 digit code "10XXX" for a carrier other than the end user's primary Carrier, or some other code designated for that purpose. Once a Carrier is selected for a call attempt, the appropriate carrier access code is inserted before the call attempt's routing data, (NPA)NXX-XXXX, the last four digits identifying the particular line served by the called party's NPA-NXX switch. The subscribing switch may also have dedicated direct links to one or more carrier points of presence. If such a carrier is selected, the subscribing switch would route the call attempt directly to that link. While the currently predominant numbering scheme for network switching end points is the North American Numbering Plan, other numbering schemes identifying route originating points and terminating points are possible and may be used as telecommunication technology evolves.

The competing carriers bid for traffic by transmitting to the Moderator the economic incentive each carrier will offer for traffic over each route it serves (or, at least, each route it wishes to compete for using the bidding process). The economic incentive presently contemplated as being most usual is the rate (amount of money charged per unit of time). However, many other kinds of economic incentive may be offered, such as a credit toward other services (e.g., frequent flyer points) or a credit toward an additional rebate that may be offered if a user's traffic for a given month rises above a threshold. The economic incentive could be a combination of rate and another incentive. But the economic incentive should be selected from a limited set authorized by the provider of the bidding mechanism, because the incentive must be capable of being evaluated by the software in each subscribing switch's adjunct computer. A Carrier may wish to submit more than one bid for routes that originate at points at which it offers more than one class of service (e.g., switched service to some subscribers, dedicated access to others, or both classes of service to some).

Each bid must be associated with a time period within which the bid will be effective. The rules of the bidding process can be structured in many ways. The following are examples of possible bidding rules.

a) The day is divided into blocks of time by the bidding service provider and bids are submitted for each block of time. All bids for a given block of time must be submitted prior to a cut-off time that precedes that block of time by a protection interval. Any bid received after the cut-off time is considered to be effective for the next block of time, unless a new bid is subsequently received from the same Carrier for that route. The protection interval is needed to permit processing of the information by the Moderator and transmission of bids to the adjunct computers prior to the bid's start time. For example, if thirty minute blocks of time are auctioned, a five minute protection interval may be appropriate.

b) Carriers are permitted to submit bids for any time interval by specifying a start time and a termination time or a start time and a good-until-cancel instruction. However, no bid can be effective before a protection time interval specified by the bidding service provider. The bidding service provider can provide confirmation of received bids back to the carrier if the data link from the Moderator to the Carriers is provided with a selective messaging capability.

c) Carriers may be permitted to enter default bids for any route or block of time for which they transmit no other bid.

d) As a fail-safe mechanism, to avoid use of old bids that have not been changed due to communication failure, the Moderator may impose a rule setting a time limit (a fail-safe protection time) to the applicability of any bid. At the expiration of the time limit, the expired bid could default to a preset default bid or to no bid. Such a rule could also be built into the adjunct computer software to protect against a failure in the Moderator-to-adjunct computer data link.

The principal data feedback from the Moderator to the Carriers is the broadcast of all bidding data from the Moderator to each of the Carriers. This permits the Carriers to adjust their own bids for any particular route in view of other carriers' bids for that route. In a block of time bidding scheme this broadcast transmission may take place, in different service offerings, either before or after the bid cutoff time for a given block of time. If broadcast before the cutoff time, the Carriers have an opportunity, up to the cutoff time, to adjust their bids for that block of time. If the service is arranged for broadcast back to the Carriers after the cutoff time, the Carriers can adjust their bids for the next or subsequent blocks of time. If the bids are broadcast back to the Carriers after the cutoff time but before the bid's effective time, the Carriers would be able to manage their networks to take account of that time interval's bid structure. The bids can be adjusted to be higher or lower, dependent on whether the Carrier, in view of the state of its network traffic, wishes to further encourage or discourage additional traffic. The Carrier may wish to reduce its bid, for example, to encourage additional traffic on an underutilized telecommunication facility, or increase its bid to discourage traffic over a facility approaching a congested state. Depending on the transmission and computer technologies used, broadcast back to the Carriers could also be accomplished by posting all bids on a bulletin board system, making them available for retrieval by all Carriers.

An evolutionary development in local exchange switch architecture is the combination of a "dumb" switch and a "smart" peripheral computer. In this arrangement the switch accomplishes the actual connection between incoming and outgoing telecommunication facilities and the switch operating software performs the management functions specifically supporting the switching function. The peripheral computer contains the service-related software. This arrangement permits the telecommunication service provider to modify its service offerings without the need to ask the switch manufacturer to change the switch's operating software. Through use of a intelligent peripheral computer, one service that could be offered to all subscribers, including small businesses and individuals, is least cost routing. As in PBX least cost routing, the routing of a call attempt is dependent on population of a routing table. This table is a memory file containing the cost (or other economic incentive) of call carriage over each route accessed by the switch. In accordance with the herein disclosed process, this routing table could be populated by an adjunct computer, based on economic incentive data from a bidding Moderator and decision rules entered by a switch administrator. Or, with appropriate software, the adjunct computer function could be incorporated in the peripheral computer. With this combination of software implementations, a telecommunication service provider could offer least cost routing service, at economically advantageous rates based on a bidding process, to all of its subscribers. The network architecture involved is as illustrated in FIG. 1, where the switch 3 represents the combination of the dumb switch and the intelligent peripheral computer and the input and output lines 12, 13 represent all of the telecommunication facilities accessed by the switch 3.

The bid information being transmitted between the Moderator, the Carriers, and subscribing switches is sensitive business information and may need, under various circumstances, to be encrypted. Depending on how the service is arranged, there may be a need to protect the privacy of bids from interception by other participating Carriers or from interception by non-participating carriers. Some of the most sensitive information would be bid information sent from the Carriers to the Moderator and bid confirmation messages from the Moderator to the Carriers. Some less sensitive information would be the bids broadcast back to all participating Carriers after the cutoff time for a given block of time. There are several encryption schemes known in the art for such use, including the RSA and PGP schemes.

Figure 5:
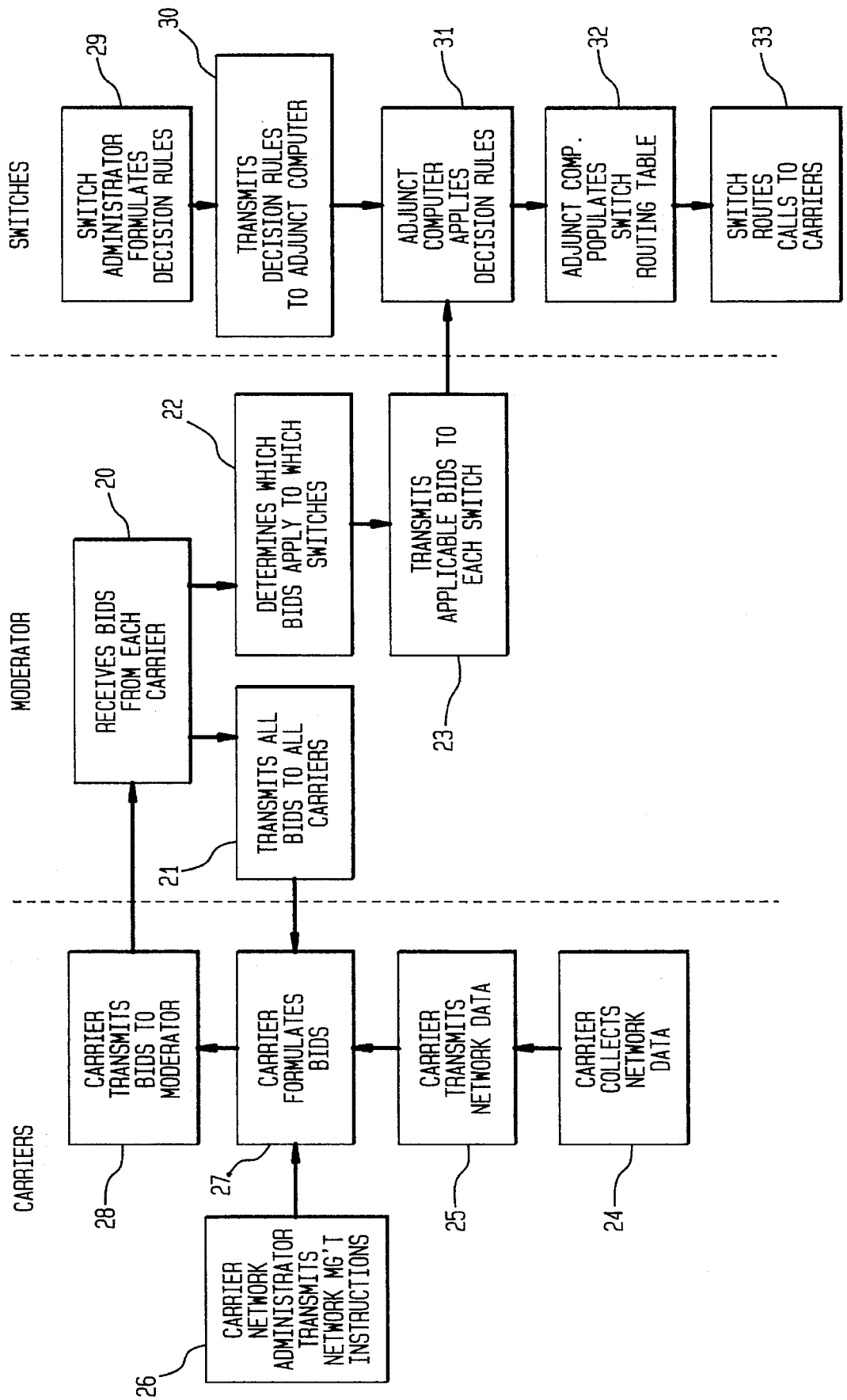
FIG. 5 is a schematic representation of an exemplary process of the invention showing transmission of bid information from the Moderator to the subscribing switches.

FIG. 5 illustrates the bidding process of this invention. The process is carried out by the participating interexchange Carriers, acting through their network management computers, the bidding service provider, acting through the Moderator computer, and the subscribing switches, acting through their adjunct computers. The carriers' primary purpose is to maximize revenue from the carriage of telecommunication traffic over their networks. The subscribing switches are usually managed to obtain telecommunication service most economically.

In operation of the bidding process, the Moderator receives bids 20 from each Carrier specifying the economic incentive the Carrier is willing to offer for each route it serves. This information is stored in the computer's memory. At a time appropriate to the particular service arrangement in operation, the Moderator transmits 21 all bids received from all Carriers to each of the Carriers. The Moderator also processes the data in a sorting operation to determine which bids are for routes that have an originating point associated with each subscribing switch and transmits 23 the appropriate bids to each such switch.

Each subscribing switch is operated by a switch administrator that formulates 29 the decision rules to be applied by the switch's adjunct computer. A decision rule may be, for example, a simple instruction to switch a call attempt to the Carrier that has submitted the lowest cost bid. The rules may include an instruction to route all calls in a particular time period (e.g., from midnight to 6:00 A.M.) to a particular Carrier to satisfy the requirements of a contract between the switch's owner and that Carrier, or because that Carrier has contracted to carry all traffic during that time period for a flat monthly fee. The switch administrator may also instruct the computer to value a non-rate economic incentive in a particular way. The bids and decision rules are received by the adjunct computer and stored in a data base in its memory. The adjunct computer applies 31 the decision rules to the economic incentive data received as bids and generates the Carrier selection data needed to populate the switch's routing table. The routing table is the file that is accessed by the switch's least cost routing software to decide which Carrier will receive a call attempt. The software will also provide for treatment of failed call attempts (e.g., retry, try the next lowest cost carrier, or default to the primary carrier). When a call attempt is presented to the switch, a routing decision is made and the call routed 33 to a carrier for transmission to the call's destination. In order to route a call, the subscribing switch's operating software connects the input register carrying the call attempt to the output register connected to the local carrier's local exchange switch or to the selected interexchange carrier's point of presence.

The transmission of bid information between the Carriers and the Moderator is a feed back process. Each Carrier transmits 28 its economic incentive bids to the Moderator and the Moderator transmits 21 all received bids to each Carrier. The Carrier starts its bid formulation by collecting 24 network data, such as the capacity and traffic loading of each network facility, and transmitting 25 this network data to the Carrier's network management computer. The network data can be entered by keying it in or over a data link from the Carrier's network operations systems. The Carrier's network administrator enters (e.g., by keying them in or by data link) network management instructions, such as the fact that a particular facility is being taken out of service for maintenance or has a trouble that reduces its transmission capacity. The network management instructions could also be based on network performance characteristics, such as response time, or competitive business factors, such as the intent to compete more intensively for traffic to a specific region of the country or over routes that compete directly with another specified Carrier.

Software within each Carrier's network management computer then accesses the network data, the network management instructions, and the bid data received from the Moderator, from the computers memory and determines 27 the economic incentive the Carrier will bid for traffic over each route. These data are accessed by means of the data buses and registers commonly internal to a computer. These bids are stored in the computer memory and transmitted 28 to Moderator. Since the network management computer has access to the bids of all other Carriers, during each bidding cycle each Carrier has the opportunity to adjust its bids in view of the bids of all other Carriers for traffic over each route. This adjustment may be accomplished automatically by the software in response to the network management instructions, or may be accomplished by direct input from the network administrator viewing displayed bidding data. The result of such adjustment consideration may be a decision to leave the bid as originally calculated, as being appropriate to accomplish the network administrator's objective.

Figure 6:
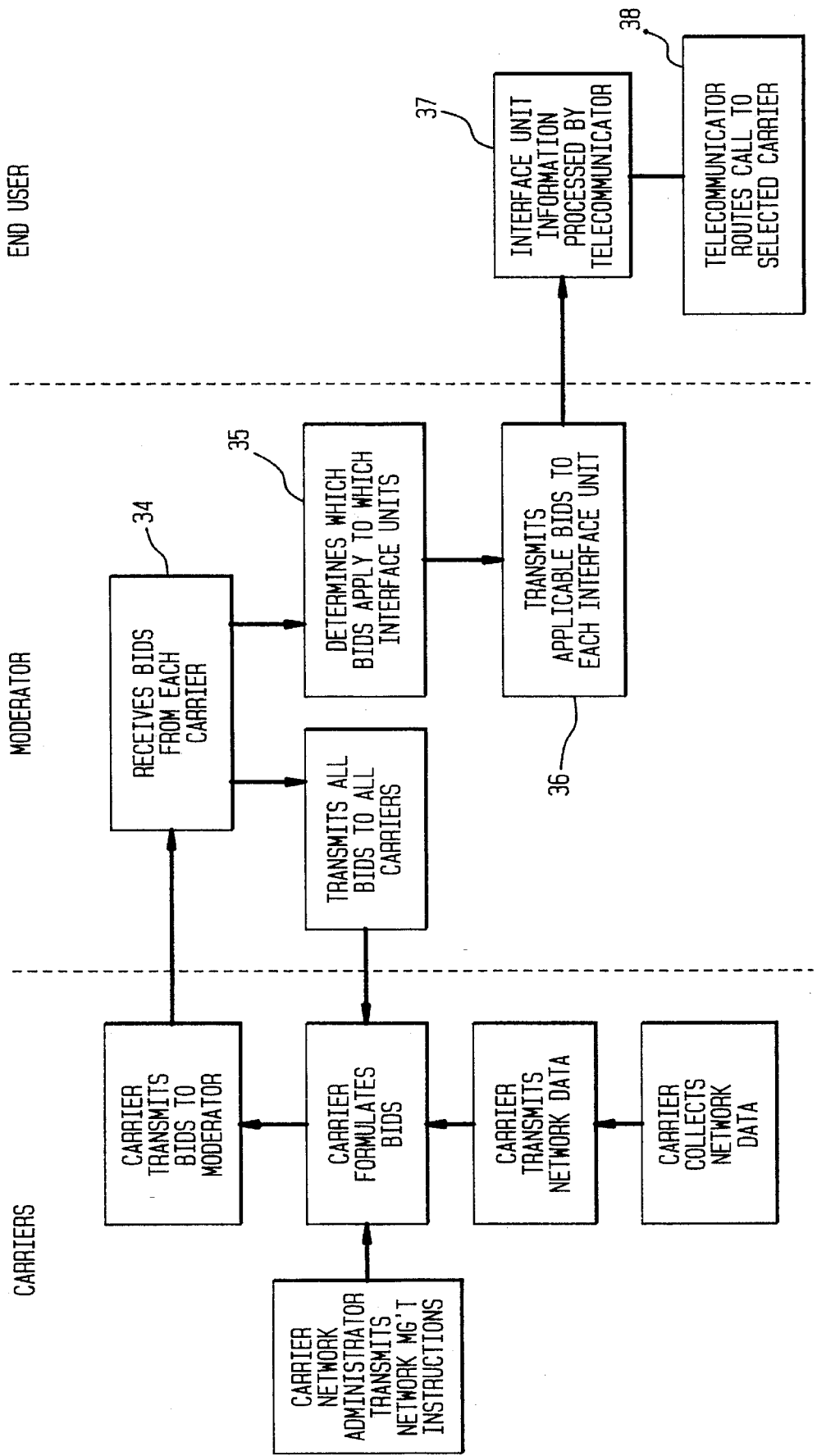
FIG. 6 is a schematic representation of an exemplary process of the invention showing transmission of information from the Moderator directly to end users.

FIG. 6 illustrates a process by which Carriers submit bids directly to end users for traffic originating in a specified NPA-NXX (or a group of NPA-NXXs, including a group comprising all NPA-NXXs in the North American Numbering Plan) and terminating anywhere. Here the Moderator receives bids 34 as before. However, the bids are independent of terminating point. The Moderator processes the data to sort it by originating point to determine 35 which bids apply to which end users, each end user having an interface unit to receive and store the data. The Moderator then transmits 36 the bid data for a particular NPA-NXX (or group of NPA-NXXs) to the interface units of all subscribing end users in such NPA-NXX originating point areas (i.e., all subscribing end users served by the local exchange switch for each such NPA-NXX), as interface unit information. The information may be displayed for evaluation by the end user or processed, within the interface unit, with direction from the end user, and all outgoing calls routed to the selected carrier. If the carrier information is displayed for the end user, the end user can choose a carrier for a call attempt and key in the selected carrier's carrier identification code before the desired telephone number. If the information is processed automatically within an interface unit, in the line or wireless connection between the end user's terminal equipment and the local exchange switch or an interexchange carrier's point of presence, the interface unit can automatically insert the appropriate carrier identifier before the outgoing telephone numbers. The interface unit could be a stand-alone piece of equipment, an attachment incorporated into the end user's terminal equipment or a software-defined portion of the-end user's terminal equipment.

At the end user, the degree of automation of the process depends on the particular telecommunication terminal equipment being used. If the terminal equipment is a simple telephone, the telecommunicator function 37 specified in FIG. 6 may consist of the end user reading the bids from a display screen in the interface unit, making the routing decision, and routing 38 the call attempt by keying in the selected carrier access code. If the terminal equipment is more complex, such as a personal computer or other microprocessor-containing equipment, the decision can be software implemented. The carrier access code could be inserted by the terminal equipment or by the interface unit, if the interface unit is in the end user's telecommunication access line or wireless connection to the telecommunication network.

Figure 7:
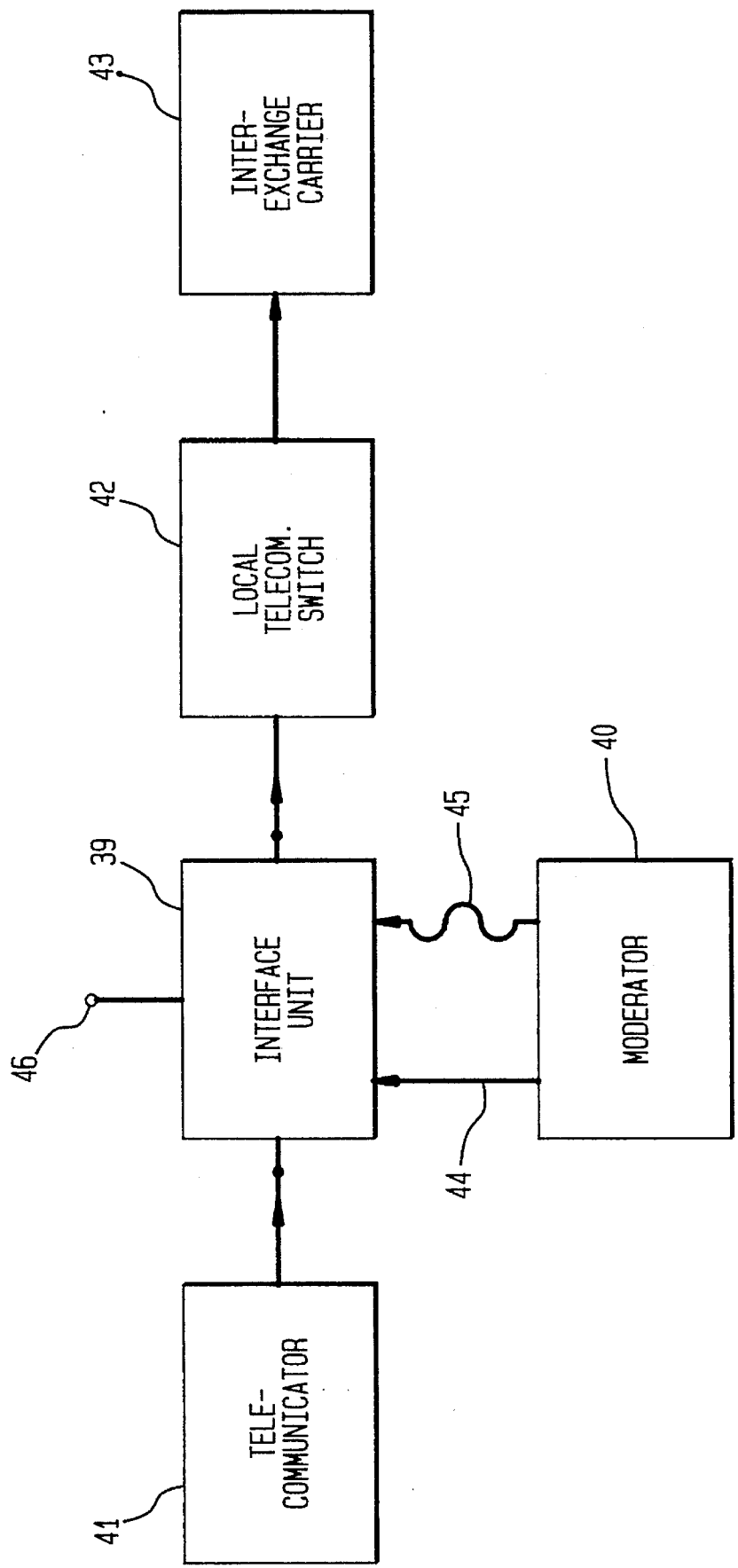
FIG. 7 is a schematic view of an exemplary end user portion of a system of the invention.

FIG. 7 illustrates the interface unit's position within the bidding architecture of FIG. 6. The interface unit 39 receives bid data from the Moderator 40 over a telecommunication facility that may be a wire link 44 or a wireless link 45. The interface unit has either a wired input port or contains a wireless receiver (e.g., radio or optical). The interface unit 39 is in the telecommunication path between the telecommunicator and the external telecommunication network, such as the local exchange switch 42 that routes the call to the selected interexchange carrier 43 in response to the carrier access code. The interface unit may have a separate end user input port 46 for use by the end user to key in the selected carrier access code each time a call is placed. The end user may also be able to key in a carrier selection and the interface unit may contain a tone generator or digital signal generator necessary to automatically insert the carrier access identification code for each call attempt. The interface unit 39 may also have a screen to display the bid information to the end user.

What is claimed is:

1. A method for controlling a telecommunication network in which a moderating computer collects economic incentive data from each carrier of a plurality of telecommunication carriers, processes the economic incentive data and distributes processed data to a plurality of telecommunications switches, each switch associated with an originating point, thereby enabling each telecommunication switch of the plurality of telecommunication switches to make an economic choice as to which carrier of the plurality of telecommunication carriers each call attempt presented to each telecommunication switch shall be routed, wherein the method comprises:

a. receiving in the moderating computer, economic incentive data specifying the economic incentive each carrier will place on a call from each originating point of a plurality of originating points to each terminating point of a plurality of terminating points, processing the economic incentive data to determine which of the economic incentive data correspond to a first originating point, and storing the economic incentive data in a data base of the moderating computer as first originating point data;

b. identifying a first set of telecommunication switches of the plurality of switches, each switch associated with the first originating point, and transmitting the first originating point data to each of the first set of telecommunication switches; and c. transmitting the first originating point data to each carrier of the plurality of telecommunication carriers.

2. A method of claim 1 in which the economic incentive data is rate data.

3. A method of claim 1 in which the economic incentive data received from each carrier is valid for a specified first block of time.

4. A method of claim 3 in which the first block of time is specified by a start time and a termination time.

5. A method of claim 3 in which the first block of time is specified by a start time and a good-until-cancel instruction.

6. A method of claim 3 in which the economic incentive data valid for the first block of time must be received by the moderating computer prior to a cut-off time that precedes the first block of time by at least a protection interval.

7. A method of claim 6 in which the economic incentive data received by the moderating computer after the cut-off time for the first block of time is valid for a subsequent block of time.

8. A method of claim 1 in which each element of economic incentive data includes a specification of initial validity time and such element of economic incentive data is received by the moderating computer at least a protection interval of time before the initial validity time.

9. A method of claim 8 in which each element of economic incentive data further includes a terminal validity time.

10. A method of claim 3 in which the economic incentive data includes a specification of subsequent blocks of time for which the economic incentive data is valid.

11. A method of claim 6 in which the first originating point data is transmitted to the plurality of telecommunication carriers after the cut-off time.

12. A method of claim 1 in which the first originating point data corresponding to a first carrier of the plurality of carriers is the same for all terminating points.

13. A method of claim 1 in which the first originating point data corresponding to a first carrier of the plurality of carriers is the same for all originating points and all terminating points.

14. An automated call routing method for enabling a telecommunication switch with a computer adjunct to the telecommunication switch, the telecommunication switch being associated with an originating point, to make an economic choice, in accordance with carrier selection data in a routing table, specifying to which carrier of a plurality of telecommunication carriers a call attempt presented to the telecommunication switch shall be routed for transmission of telecommunications to a first terminating point, wherein the method comprises the steps of:

a. entering decision rules relating to a plurality of telecommunication carriers into the adjunct computer and storing the decision rules in a data base;

b. entering economic incentive data from at least one carrier of the plurality of telecommunication carriers corresponding to the first terminating point and storing the economic incentive data in the data base;

c. within the adjunct computer, applying the decision rules to the economic incentive data and populating the switch's routing table with the carrier selection data corresponding to the first terminating point; and d. routing the call attempt to a first carrier of the plurality of telecommunication carriers based on the carrier selection data.

15. A method of claim 14 in which, for a failed call attempt, the decision rules specify routing the call attempt to the carrier, of the plurality of telecommunication carriers, associated with the next most favorable economic incentive data.

16. A method of claim 14 in which, for a failed call attempt, the decision rules specify routing the call attempt to a default carrier, of the plurality of telecommunication carriers.

17. A method of claim 14 including displaying at least a portion of the economic incentive data at the adjunct computer.

18. Method for managing traffic loading of a first telecommunication carrier over a first telecommunication facility of a network from a first originating point to a first terminating point, wherein the network comprises a plurality of telecommunication facilities connecting a plurality of originating points to a plurality of terminating points and is administered by a carrier network administrator, by providing an economic incentive for each switch of a plurality of telecommunication switches to route call attempts to the first telecommunication facility, and adjusting the economic incentive, wherein the telecommunication carrier is one of a plurality of telecommunication carriers, wherein the method comprises:
   a. collecting carrier network data relating to the first telecommunication facility and entering the carrier network data into a computer data base;
   b. receiving network management instructions from the carrier network administrator and storing the network management instructions in the computer data base;
   c. accessing the carrier network data, determining the economic incentive relating to the first telecommunication facility, which economic incentive is dependent on the carrier network data and the network management instructions, and storing the economic incentive in the computer data base;
   d. receiving, from a bidding moderator, economic incentive data relating to at least a second telecommunication facility belonging to at least a second telecommunication carrier and extending from the first originating point to the first terminating point and adjusting the economic incentive based on the received economic incentive data; and
   e. transmitting the economic incentive to the bidding moderator.

19. A method of claim 18 in which the economic incentive is valid for a specified first block of time.

20. A method of claim 19 in which the economic incentive for the first block of time is adjusted based on the economic incentive data.

21. A method of claim 19 in which the economic incentive for a subsequent block of time is adjusted based on the economic incentive data.

22. A method of claim 18 in which the network management instructions result in determining that the economic incentive for all telecommunication facilities originating at the first originating point is the same as the economic incentive for the first telecommunication facility.

23. A method of claim 18 in which the carrier network data includes network capacity data and telecommunication traffic data.

24. A method of claim 18 in which the economic incentive is rate.

25. A method for routing a telecommunication call attempt presented to a telecommunication switch associated with an originating point to a first telecommunication carrier of a plurality of telecommunication carriers in accordance with economic incentives arrived at through a bidding process involving a central processor, referred to as a bidding moderator, wherein the method comprises the steps of:
   a. collecting carrier network data for each of the telecommunication carriers, each telecommunication carrier entering the data corresponding to the telecommunication facilities constituting its network into its traffic management computer's traffic management database;
   b. each traffic management computer receiving management instructions from that carrier's network administrator, formulating economic incentives for at least a portion of the carrier's telecommunication facilities based on the management instructions and the carrier network data, and transmitting the economic incentives to the bidding moderator;
   c. in the moderator, receiving the economic incentives, entering the economic incentives from each carrier in the moderator's database, and sorting the economic incentives to identify all economic incentives associated with each telecommunication route specified by an originating point and a terminating point;
   d. transmitting all of the economic incentives received by the moderator to each of the plurality of carriers, entering the economic incentives in each traffic management database, and adjusting each carrier's economic incentives in consideration of the economic incentives from all carriers;
   e. sorting the routes to determine which routes have an originating point associated with the telecommunication switch, transmitting all economic incentives associated with such routes to an adjunct computer, adjunct to the telecommunication switch, and entering the economic incentives into the adjunct computer's database;
   f. transmitting decision rules formulated by the telecommunication switch's switch administrator to the telecommunication switch's adjunct computer and entering the decision rules in the adjunct computer's database;
   g. in the adjunct computer, applying the decision rules to the economic incentives thereby generating routing data, and populating the telecommunication switch's routing table with the routing data; and
   h. routing the call attempt to the first telecommunication carrier in accordance with the routing table.

26. A method of claim 25 in which the economic incentive is rate.

27. A method of claim 25 including displaying at least a portion of all of the economic incentives at the traffic management computer of at least one of the plurality of carriers.

28. A telecommunication management system for a first telecommunication carrier comprising:
   a. a computer with a processor and a memory;
   b. means for inputting carrier network data into the computer and storing such data in the memory;
   c. means for inputting network instructions into the computer and storing such instructions in the memory;
   d. means for receiving economic incentive data from a bidding moderator, the economic incentive data identified with a plurality of telecommunication carriers;
   e. means for determining economic incentive data identified with the first telecommunication carrier, dependent on the network instructions, the carrier network data, and the economic incentive data; and f. means for transmitting the economic incentive data identified with the first telecommunication carrier to the bidding moderator.

29. A system of claim 28 in which the network data includes network capacity data and telecommunication traffic data.

30. A system of claim 28 in which the network data includes competitive business decision data.

31. A telecommunication traffic bidding moderator for enabling a first telecommunication switch of a plurality of telecommunication switches to route call attempts to a plurality of telecommunication carriers in accordance with economic incentives generated by the telecommunication carriers, wherein the moderator comprises:

a. a computer with a processor and a memory;

b. means for receiving economic incentive data from a first telecommunication carrier and storing the economic incentive data, identified with the first telecommunication carrier in the memory;

c. means for transmitting all of the economic incentive data received from a plurality of telecommunication carriers to each carrier of the plurality of telecommunication carriers;

d. means for sorting the economic incentive data received from the plurality of telecommunication carriers to determine a first subset of such data corresponding to the first telecommunication switch; and e. means for transmitting the first subset of economic incentive data to the first telecommunication switch.

32. An automated call routing system for routing a call attempt presented to a telecommunication switch to a first telecommunication carrier of a plurality of telecommunication carriers, wherein the system comprises:

a. a telecommunication switch;

b. a computer adjunct to the telecommunication switch, which adjunct computer has a processor and a memory;

c. means for receiving decision rules from a switch administrator and storing the rules in the memory;

d. means for receiving economic incentive data from the bidding moderator and storing the economic incentive data in the memory;

e. means, within the processor, for accessing the rules and the economic incentive data in the memory and applying the rules to the economic incentive data to produce carrier selection data, dependent on the economic incentive data;

f. means for transmitting the carrier selection data to the telecommunication switch in order to populate the telecommunication switch's routing tables; and g. means for routing the call attempt to the first telecommunication carrier, based on the carrier selection data in the routing table.

33. A call routing system of claim 32 in which the telecommunication switch comprises a dumb switch and an intelligent peripheral computer.

34. A call routing system of claim 33 in which the adjunct computer is a software defined portion of the intelligent peripheral computer.

35. A method for distributing economic incentive data concerning a telecommunications network to end users, in which method a moderating computer collects the economic incentive data from each carrier of a plurality of telecommunication carriers, processes the economic incentive data and distributes processed data to a plurality of interface units, each interface unit being associated with one of a plurality of telecommunicators and each associated with an originating point, thereby enabling each of the plurality of telecommunicators to make an economic choice as to which carrier of the plurality of telecommunication carriers each call attempt generated by each telecommunicator shall be routed, wherein the method comprises:

a. receiving in the moderating computer, economic incentive data specifying the economic incentive each carrier will place on a call from a first originating point and storing the economic incentive data in a data base as first originating point data;

b. identifying a first set of interface units of the plurality of interface units, each interface unit of the first set of interface units associated with the first originating point, and transmitting the first originating point data to each of the first set of interface units; and c. transmitting the first originating point data to each carrier of the plurality of telecommunication carriers.

36. A method of claim 35 including displaying the first originating point data on a display device in the interface unit.

37. A method of claim 35 including selecting the telecommunications carrier to which to route all call attempts, on the basis of the economic incentive data, each call attempt including routing data.

38. A method of claim 37 including inserting a carrier identifier, identifying the telecommunications carrier, in the routing data of each call attempt.

39. A method of claim 37 in which the carrier identifier is inserted automatically by the interface unit.

40. A telecommunication traffic bidding moderator for enabling a first telecommunicator of a plurality of telecommunicators, the first telecommunicator being associated with a first originating point, to route call attempts to a plurality of telecommunication carriers in accordance with economic incentives generated by the telecommunication carriers, wherein the moderator comprises:

a. a computer with a processor and a memory;

b. means for receiving economic incentive data from a first telecommunication carrier and storing the economic incentive data, identified with the first telecommunication carrier in the memory;

c. means for transmitting all of the economic incentive data received from a plurality of telecommunication carriers to each carrier of the plurality of telecommunication carriers;

d. means for sorting the economic incentive data received from the plurality of telecommunication carriers to determine a first subset of such data corresponding to the first originating point; and e. means for transmitting the first subset of economic incentive data to a first interface unit associated with the first telecommunicator.

41. A moderator of claim 40 in which the means for transmitting the economic incentive data includes means for wireless transmission of the first subset of economic incentive data to a wireless receiver in the first interface unit.

42. A moderator of claim 40 in which the means for transmitting economic incentive data is adapted for transmitting the first subset of economic incentive data to all telecommunicators associated with a set of first originating points.

43. An interface unit for routing a call attempt placed by a telecommunicator to a first telecommunication carrier of a plurality of telecommunication carriers in response to economic incentive data received from a moderator and decision rules received from an end user, the interface unit comprising:

a. a first input port for receiving the call attempt from the telecommunicator, the call attempt including routing data;

b. a second input port for receiving the decision rules from the end user;

c. means for receiving the economic incentive data from the moderator;

d. a processor for selecting the first telecommunication carrier in response to the economic incentive data and the decision rules;

e. means for inserting a first carrier identifier, corresponding to the first telecommunication carrier into the routing data; and f. an output port for transmitting the call attempt.

44. An interface unit of claim 43 in which the means for receiving economic incentive data includes a wireless transmission receiver.

45. An interface unit of claim 43 further including a display device for displaying at least a selected portion of the economic incentive data.

46. A method of claim 1 in which each element of the first originating point data is valid only for a fail-safe protection time.

47. A method of claim 14 in which each element of the economic incentive data is valid only for a fail-safe protection time.

* * * * *